310-335 SR

8/20/85 XR 4,535,630

United States Patent [19]

Samodovitz

[11] Patent Number: 4,535,630

[45] Date of Patent: * Aug. 20, 1985

[54] MULTIPLE CURVED TRANSDUCERS PROVIDING EXTENDED DEPTH OF FIELD

[76] Inventor: Arthur J. Samodovitz, 1 Lakeshore Dr., Apt. A-4, Farmington, Conn. 06032

[*] Notice: The portion of the term of this patent subsequent to Jun. 14, 2000 has been disclaimed.

[21] Appl. No.: 458,742

[22] Filed: Jan. 17, 1983

[51] Int. Cl.³ ............ G01N 29/00

[52] U.S. Cl. ............ 73/642; 310/335

[58] Field of Search ............ 73/642, 641, 625, 626, 73/628, 644; 367/150, 153; 181/176; 310/334, 335, 336, 800

[56] References Cited

U.S. PATENT DOCUMENTS

| | | | |
|---|---|---|---|
| 4,016,751 | 4/1977 | Kossoff | 73/627 |
| 4,276,491 | 6/1981 | Daniel | 73/626 |
| 4,459,853 | 7/1984 | Miwa et al. | 73/626 |

*Primary Examiner*—Stephen A. Kreitman

[57] ABSTRACT

The invention is an apparatus useful in ultrasonic imaging to provide a highly focussed wave with a large depth of field. The apparatus comprises two or more coaxial, curved transducers, each producing adjacent, coaxial fields.

12 Claims, 5 Drawing Figures

MULTIPLE CURVED TRANSDUCERS PROVIDING EXTENDED DEPTH OF FIELD

CROSS-REFERENCES TO RELATED APPLICATIONS

My previous application, Ser. No. 222,947, "Multiple Field Acoustic Focusser", filed 1/6/81 now U.S. Pat. No. 4,387,599 is another invention aimed at extending the depth of field of a transducer,

Statement as to Rights to Inventions Made Under Federally-sponsored Research and Development None.

Field of the Invention

The invention relates to ultrasonic imaging, and more particularly to a means to provide a narrow, high resolution ultrasonic beam over a large depth of field, said means comprising a plurality of curved transducers located along an axis.

Description of the Prior Art

Ultrasound is used to provide an image of the inside of a specimen such as the abdomen of a human being. A standard ultrasonic imaging system includes a curved transducer which radiates an ultrasonic beam at the specimen. The curvature causes the beam to focuss at a particular location inside the specimen. The wave interacts with the specimen producing echoes, some of which reflect back onto the transducer. In response to these echoes, the transducer produces corresponding electrical signals which are used to generate a linear or "A" scan image of the target. Then, the transducer can be aimed at adjacent targets within the specimen to produce additional "A" scans which can be combined to produce a "B" scan, or cross-section of the entire specimen. See Kossoff U.S. Pat. No. 4,016,751 for additional discussions of "A" and "B" scan imaging.

A high resolution focussed image requires a transmitted beam with a small, cross-section and a large depth of field, the region over which the beam cross-section is small. In conventional imaging systems utilizing one curved transducer or one flat transducer with a lens, the smallest cross-section width is proportional to the depth of field so, to produce a small cross-section or high resolution region, the depth of field must be small also, which is undesirable.

Two prior art techniques can be used to increase the depth of field while retaining high resolution. The first technique utilizes two or more curved transducers on one flat transducer with two or more lenses of different focal lengths, and the different curved transducers or lenses are interchanged mechanically to provide two or more fields. The fields are adjacent and coaxial so they can be combined to produce a composite, large depth of field. The problem with this technique is that it takes too long to interchange lenses or transducers, and it requires precise alignment.

Another prior art system, that disclosed in Kossoff U.S. Pat. No. 4,016,751, utilizes a multicurved transducer; the inner portion has high curvature and focusses in the near field, and the outer, coaxial portion has lesser curvature and focusses in the far field. Kossoff also discloses another transducer behind the multicurved one with curvature equal to that of the outer portion of the multicurved one.

This prior art system has drawbacks also. First, if the outer portion of the multicurved transducer is used to focuss in the far field, it will produce large side lobes due to its donut shape; it has no inner region to accentuate the main lobe. Large side lobes cause radiation of regions outside the central beam and thus, cause extraneous echoes. If the rear transducer is used to irradiate the far field, the nonuniform, multicurved transducer in front of it will interfere with the focussing of the rear transducer; assuming the density of the multicurved transducer is different than that of the frontal coupling medium and target tissue, the velocity of propagation of the transmitted wave in the multicurved transducer is different than that in the coupling medium and tissue, and since the multicurved transducer has varying, discontinuous thickness, portions of the transmitted wave will arrive at the supposed field out of phase with outer portions. Thus, the focussing ability of the entire, rear transducer is lost.

There are other prior art systems which discuss focussing problems and are cited for information; they are not deemed sufficiently similar to the present invention for further discussion: Green U.S. Pat. No. 3,913,061, Rose U.S. Pat. No. 4,213,344, Flourney U.S. Pat. No. 3,995,179, Mezrich U.S. Pat. No. 4,138,895, and Green U.S. Pat. No. 4,097,835.

SUMMARY OF THE INVENTION

It is a first object of the invention to provide a transducer assembly which has good resolution over a large depth of field.

It is a second object of the invention to provide such resolution and depth of field without mechanical motion.

To satisfy these objects and others, there are provided a transducer assembly comprising two (or more) coaxial, curved transducers. The one in front has a large enough diameter to intercept the main frontal waves transmitted by the rear transducer, both transducers have continuous or smooth curvature without sharp discontinuities in their curvature, and the two transducers focuss upon adjacent, coaxial regions.

DETAILED DESCRIPTION OF THE FIRST EMBODIMENT

Figure 1:
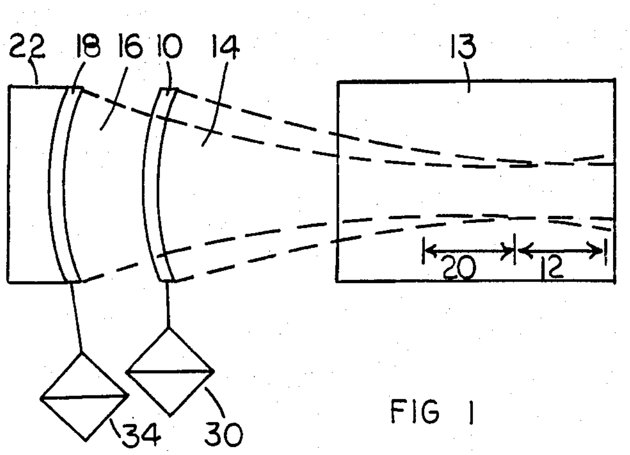
FIG. 1 shows a cross-section of two, coaxial curved transducers in accordance with the first embodiment of the invention, and their coaxial, adjacent fields.

The structure and function of the first embodiment are shown in FIG. 1. Transducer 10 is "curved" meaning that it is spherically concave in three dimensions like a bowl; (less optimally, it can be curved in two dimensions only like a snow shovel). Being curved, it focusses over tube shaped region, field 12. Transducer 10 comprises a curved, piezoelectric element, one electrode on the front side facing specimen 13, one electrode on the opposite, rear side, and matching layers to match the acoustical impedance of transducer 10 to that of coupling mediums 14 and 16. Medium 14 is water or a jell with the same density as water and interfaces transducer 10 to the specimen 13. Medium 16 can also be water, or the jell, or a material of any density, rigid or elastic. Transducer 18 is curved to focuss over tube shaped region, field 20, and comprises a curved piezoelectric element, an electrode on the front side facing transducer 10, an electrode on the rear side facing backing member 22, and a matching layer on the front side to couple transducer 18 to medium 16. Backing member 22 attaches to the rear of transducer 18, and absorbs and dissipates ultrasound which comes its way.

Transducer 18 is coaxial with transducer 10, has similar curvature as transducer 10, and is separated from transducer 10 by a distance equal to the depth of field of transducer 10 so that the two resultant fields are coaxial and adjacent. Together, the two fields yield a composite, double length field.

To operate the first embodiment, electronic transmitter and receiver 30 electrically excites the electrodes of transducer 10 and causes transducer 10 to transmit an acoustic wave. This wave propagates through medium 14, and focusses at field 12 inside specimen 13. Echoes result, and some of them ultimately strike transducer 10 causing transducer 10 to produce an electrical signal across its electrodes. Receiver 30 receives these electrical signals and they are used to generate a high resolution image of the tissue inside field 12.

Next, electronic transmitter and receiver 34 electrically excites the electrodes of transducer 18, and causes transducer 18 to transmit an acoustic wave. This wave propagates through medium 16, transducer 10, and medium 14, and focusses to field 20 inside specimen 13. Echoes result from the interaction of this wave with the tissue within field 20, and some of them proceed back through medium 14, transducer 10, and medium 16, and strike transducer 18. As a result, transducer 18 produces an electrical signal across its electrodes, and receiver 34 receives it and uses it to produce a high resolution image of the tissue within field 20. Any waves propagating through transducer 18 to the rear of transducer 18 are absorbed and dissipated by backing member 22.

Detailed Description of the Second Embodiment

Figure 2:
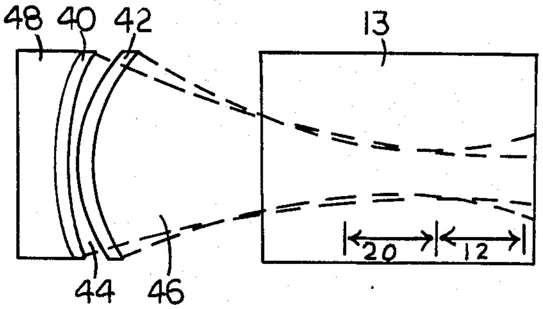
FIG. 2 shows a cross-section of two, coaxial curved transducers in accordance with the second embodiment of the invention, and their coaxial, adjacent fields.

The structure and function of the second embodiment are shown in FIG. 2. The second embodiment is similar to the first except that front transducer 42 has greater curvature than rear transducer 40, and there need not be much separation distance between the two transducers if any. The different curvatures of transducers 40 and 42 cause them to focus in coaxial, adjacent fields. Note that because they both have difference curvatures, they will not fit snugly against one another. Thus, some coupling medium 44 is required between. FIG. 2 also shows coupling medium 46 in front of transducer 42, and backing member 48 which absorbs and dissipates ultrasound.

The two transducers could just as easily be reversed in order so that the more curved transducer 42 could be in the rear of the lesser curved transducer 40. This latter arrangement may be preferrable because the waves from the rear transducer will have added dissipation through the front transducer, and so, may not have enough power left to penetrate to the far field of specimen 13.

Detailed Description of the Third Embodiment

Figure 3:
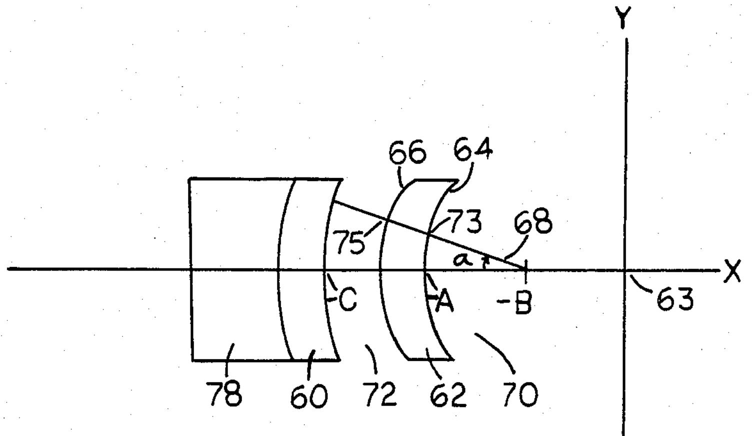
FIG. 3 shows a cross-section of the two, coaxial curved transducers of the third embodiment but with the thicknesses of the transducers greatly enlarged, and shows geometric symbols defining some parameters of the diagram.

FIG. 3 shows a close-up of the transducers of the third embodiment, with the thicknesses of each transducer greatly enlarged. FIG. 3 is used as a reference to compute the dimensions of the rear transducer 60 in the following manner:

Transducer 62 focusses along the x-axis about the origin 63. The cross-section of front face 64 of transducer 62 is defined by the equation, $x^2+y^2=A^2$, and its rear face cross-section 66 is defined by the equation $(x+T)^2+y^2=A^2$; where "T" is the thickness of transducer 62. Other standard transducer curvatures can be used. The field of transducer 62 lies approximately from $(B/2,0)$ to $(-B/2,0)$, and is tubularly shaped since transducer 62 is three-dimensionally concave, or bowl shaped. Transducer 62 can be the same as transducers 10 or 40.

Rear transducer 60 is a slightly flattened version of transducer 42, and it focusses upon the x axis with a tubular shaped field centered at $(-B,0)$. The reason that it is slightly flattened and not of standard curvature, $(x+B)^2+y^2=(-C+B)^2$, is that front transducer 62 aids in the focussing of echoes bound for transducer 60 and of waves transmitted from transducer 60 for the following reasons:

Assume that transducer 60 has already transmitted a wave and it strikes an object at point $(-B,0)$ causing an echo. This echo proceeds back toward transducer 62 along path 68 defined by $y=-x \tan a-B \tan a$. where "a" is the angle of departure from the x axis as shown in FIG. 3. This path traverses coupling medium 70, transducer 62, and coupling medium 72 before reaching transducer 60. Coupling mediums 70 and 72 are composed of identical substances, and have a lesser density than transducer 62. Thus, the velocity of propagation of ultrasound through transducer 62 is greater than through coupling mediums 70 and 72.

For different angles, a, the actual path length from $(-B,0)$ to the front face of transducer 60 in centimeters is different. However, the "effective" path length, measured in the time it takes for an echo originating at $(-B,0)$ to reach different portions of the front face of transducer 60 along different linear paths is the same because the echo travels faster through transducer 62 and has a greater travel distance through transducer 62 as angle a increases. But, as angle a increases, the actual pathlength from the source of the echo, $(-B,0)$, to the front (and rear) face of transducer 60 increases due to the curvature of transducer 60 which is a slightly flattened modification of a circular arc in two dimensions or a slightly flattened modification of a spherical bowl in three dimensions. FIG. 3 shows a cross-section of this slightly flattened spherical bowl. The increase in actual total path length as angle a increases, compensates for the increased path length and speedy propagation within transducer 62 as angle a increases.

The amount of flattening of transducer 60 is derived in the following manner:

1. Find where $x^2+y^2=A^2$ intersects $y=-x \cdot \tan a-B \cdot \tan a$, and designate intersection 73, or $(x_1, y_1)$.
2. Find where $(x+T)^2+y^2=A^2$ intersects with $y=-x \cdot \tan a-B \cdot \tan a$, and designate intersection 75 or $(x_k, y_k)$.
3. Find distance between $(x_1, y_1)$ and $x_k, y_k)$ as a function of angle a, and designate as $D_T$.

4. Find the variations in distances of step #3 as a function of angle a and designate as $\Delta D_T$ 5. Compute the variation in travel time from (B,0) to an imaginary circular arc of the circle $(x+B)^2+y^2=(-C+B)^2$ as a function of angle a by computing the variation in travel distance through transducer 60 as follows: $(1/V_{cm}-1/V_T)\Delta D_T$ where $V_{cm}$ and $V_T$ are the velocities of propagation through coupling mediums 70 and 72, and transducer 60 respectively.

6. Since an ultrasonic wave will arrive at said imaginary arc sooner for large angle a than for small angle a, the actual front face of transducer 60 must be "flattened" or shaped to be further in distance from (−B,0) for large angle a than for smaller angle a. The actual shape of the front face of transducer 60 deviates from said arc, and is flattened or pushed back from the arc by an amount equal to $(1/V_{cm}-1/V_T)\Delta D_T V_{cm}$ to provide the added, proper, delay time through coupling medium 72.

The thickness of transducer 60, like that of transducer 62 equals one fourth wavelength of the center frequency of the ultrasound which is utilized. Thus, the rear face of transducer 60 has the same shape as the front face of transducer 60 except it is displaced by an amount T from the origin along the x axis.

If the coupling mediums had a higher density than the front transducer so the ultrasound has a higher velocity of propagation in the coupling medium than in the front transducer, then the rear transducer would need more curvature than an arc of a circle.

In still other embodiments of the invention, coupling mediums 70 and 72 have different density than one another; then, to calculate the curvature of the rear transducer, first compute the travel time to the imaginary arc of the circle as a function of angle a. Then, adjust the curvature of the rear transducer as described above so that the travel time from the imaginary arc to the front face of the rear transducer compensates for the differences in travel time from (−B,0) to the arc as a function of angle a.

To calculate the curvature of the rear transducer, proceed as follows:

1. Calculate the distance from (−B,0) to $(x_1,y_1)$ as a function of angle a, and multiply by the reciprocal of the velocity of propagation of the ultrasound in coupling medium 70 to get the first segment of travel time as a function of angle a.

2. Add to #1, the travel time from $(x_1,y_1)$ to $(x_k, y_k)$, the distance between these two point times the inverse of the velocity of propagation through transducer 62.

3. Add to #2, the travel time from $(x_k,y_k)$ to the imaginary arc, $(x+B)^2+y^2=(-C+B)^2$, along line, $y=-x\cdot\tan a-B\cdot\tan a$.

4. Find the variation in travel time, $\Delta D_T$, as a function of angle a by comparing each composite travel time so that for angle a equal zero degrees.

5. To compute the deviation of rear transducer 60's curvature from that of the imaginary arc, add compensation distances from the arc: $\Delta D_T$ times the velocity of propagation in coupling medium 72.

In still other embodiments of the invention, more than two coaxial transducers are used to generate still larger composite depths of field. These additional transducers accordingly focus upon fields adjacent to and colinear with the fields of the other transducers.

In the third embodiments of the invention, the separation distance between the front and rear transducers is not critical as long as the curvatures of the transducers are such that the transducers focuss at adjacent fields.

Behind transducer 60 is backing member 78.

Fourth Embodiment of the Invention

Figure 4:
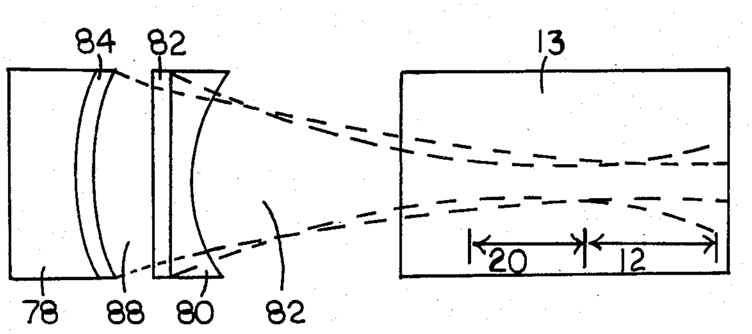
FIG. 4 shows a cross-section of a lens, flat transducer and curved transducer of the fourth embodiment, and their coaxial, adjacent fields.

The fourth embodiment of the invention is shown in FIG. 4, and comprises an acoustic lens 80 in front of and attached to flat transducer 82, and both substitute for a single curved transducer as in the any of the prior embodiments. Behind transducer 82 is a curved transducer 84 which can be of standard curvature as in the first and second embodiments or the modified curvature as discussed in the description of the third embodiments. In front of acoustic lens 80 is coupling medium 82 which comprises a substance of the same density as water such as is commercially available. Between transducers 82 and 84 is coupling medium 88 whose density is a factor in determining the curvature of transducer 84 as directed in the discussion of the third embodiments.

To summarize the relevant analysis contained in the discussion of the third embodiment useful in calculating the curvature of transducer 84, first determine the desired field of transducer 84 (adjacent and co-linear to the field of transducer 82), then curve transducer 84 so that the travel time from that field to any part of transducer 84 is approximately uniform. Note that because of the focussing property of lens 80 which acts upon waves bound for transducer 82 as well as transducer 84, the desired curvature of transducer 84 will be less than if transducer 80 and lens 80 were replaced by a single curved transducer.

Fifth Embodiment of the Invention

Figure 5:
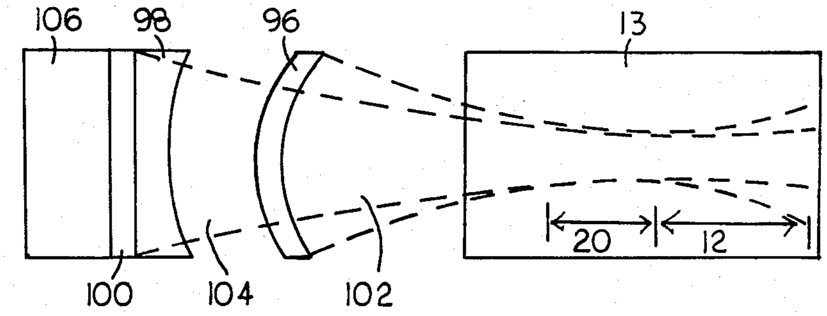
FIG. 5 shows a cross-section of a curved transdcuer, lens, and flat transducer or the fifth embodiment, and their coaxial, adjacent fields.

In the fifth embodiment, shown in FIG. 5, transducer 96 has standard curvature. Behind transducer 96 are acoustic lens 98 and flat transducer 100 which together focuss upon a field co-axial and adjacent to that of transducer 96.

Coupling medium 102 comprises water or substances having the density of water as are commercially available. Coupling medium 104 and the curvature and composition of lens 98 are chosen according to the above teachings and known technology so that the travel time for any echo proceeding towards transducer 100 is approximately the same when originating within the field of transducer 100; in other words, all echoes emanating from the field of transducer 100 arrive approximately in phase at the front face of transducer 100, and similarly, all waves transmitted by transducer wave focussing within its field arrive within the field approximately in phase.

The thickness of both transducers is one fourth the wavelength of the center frequency of the ultrasound transmitted as in standard transducers. Behind transducer 100 is backing member 106.

In all the embodiments, acoustical matching layers can be added as need according to known technology to increase the coupling between layers and reduce internal echoes.

In the fifth embodiment, by proper selection of elements, it is possible that transducer 96 can fit snugly against lens 98 so that there is no space between them except for an acoustical matching layer. The proper selection of elements is based on the "travel time uniformity" principle discussed above.

I claim:

1. Apparatus for focussing ultrasonic waves over a large field comprising:

first and second curved transducers located along an axis, having similar operating frequencies, and focussing upon adjacent fields forming a composite, extended field, the curvature of each transducer being continuous, the first transducer being in the path of the focussed waves transmitted by the second transducer, and the first transducer being large enough to intersect substantially all forward, focussed waves transmitted by the second transducer, and means for coupling the first transducer to the second transducer so that ultrasonic waves can travel efficiently between the first and second transducers.

2. The apparatus of claim 1 wherein the first transducer is coaxial with the second transducer and said fields are coaxial.

3. The apparatus of claim 2 wherein the second transducer has modified curvature means which provide a varying path length from the center of the field of the second transducer to different parts of the second transducer so that echoes originating within said field arrive substantially in-phase at all parts of the second transducer despite variations in the density of materials situated between said field and the second transducer.

4. The apparatus of claim 1 wherein both transducers have substantially the same curvature and are separated by a distance approximately equal to the depth of field of the first transducer.

5. The apparatus of claim 1 wherein the curvature of the first transducer is substantially different than the curvature of the second transducer.

6. The apparatus of claim 1 wherein the second transducer has modified curvature means which provide a varying path length from the center of the field of the second transducer to different parts of the second transducer so that echoes originating within said field arrive substantially in-phase at all parts of the second transducer despite variations in the density of materials situated between said field and the second transducer.

7. Apparatus for focussing ultrasonic waves over a large field comprising the following transducers and lens located in order along an axis:

an acoustical lens, a flat transducer whose ultrasonic waves are focussed by said acoustical lens, and a curved transducer, and means for coupling the acoustical lens to the flat transducer, and the flat transducer to the curved transducer so that ultrasound can travel efficiently from the acoustical lens, to the flat transducer, and to the curved transducer, the flat and curved transducers focussing upon adjacent fields forming a composite, extended field, and the flat transducer being large enough to intersect substantially all forward, focussed waves transmitted by the curved transducer.

8. The apparatus of claim 7 wherein the acoustical lens, the flat transducer, and the curved transducer are coaxial.

9. Apparatus for focussing ultrasonic waves over a large field comprising the following transducers and lens located in order along an axis:

a curved transducer, an acoustical lens, and a flat transducer whose ultrasonic waves are focussed by said acoustical lens, and means for coupling the curved transducer to the acoustical lens, and the acoustical lens to the flat transducer so that ultrasound can travel efficiently from the curved transducer, to the acoustical lens, and to the flat transducer, the curved and flat transducers focussing upon adjacent fields forming a composite, extended field, and the curved transducer being large enough to intersect substantially all forward, focussed waves transmitted by the flat transducer.

10. The apparatus of claim 9 wherein the curved transducer, the acoustical lens, and the flat transducer are coaxial.

11. The apparatus of claim 10 wherein the curvature of the curved transducer is the same as the curvature of the acoustical lens, and the curved transducer fits snugly against the acoustical lens.

12. The apparatus of claim 11 further comprising a matching layer sandwiched between the curved transducer and the acoustical lens.

* * * * *